Jan. 24, 1967    C. O. BADGETT    3,300,193
CONTROL APPARATUS FOR MATERIAL MIXERS
Original Filed Jan. 24, 1962

Inventor
Charles O. Badgett
Anthony D. Cennamo
ATTORNEY

United States Patent Office 3,300,193
Patented Jan. 24, 1967

3,300,193
CONTROL APPARATUS FOR MATERIAL MIXERS
Charles O. Badgett, Columbus, Ohio, assignor to the Industrial Nucleonics Corporation, a corporation of Ohio
Continuation of application Ser. No. 168,346, Jan. 24, 1962. This application July 12, 1965, Ser. No. 475,304
9 Claims. (Cl. 259—154)

This is a continuation of a prior copending application Serial No. 168,346, filed January 24, 1962, now abandoned.

This invention relates generally to concrete blending processes and more particularly to improved roadway paving machinery utilizing continuous blending of dry ingredients.

Concrete paving operations are usually accomplished through batching techniques. Concrete batching is presently done through manual or semi-automatic programming devices utilizing weigh hoppers to determine weights of sand, aggregate, cement and water. Several batching plants may be located near a metropolitan area or they may be of portable construction and located along a highway construction job. In the latter case, trucks having multiple compartments, each containing one complete mix, are filled with dry ingredients under a multiple hopper mechanical weighing plant and then driven to the concrete mixer integral with or associated with the paving machine.

The weigh hoppers are only as good as the maintenance of the knife edges, beams and other moving parts will permit. These devices malfunction due to cement and dust deposits and require constant maintenance and inspection. In addition the necessity of utilizing weigh hoppers dictates a larger than necessary steel structure to keep the feed bins above and capable of feeding by gravity into the weigh hoppers.

The present invention eliminates these disadvantages by providing a compact mobile assembly including feed bins mounted ahead of the paving machine and apparatus for measuring and automatically controlling the ingredients as they are continuously added to the mixer of the paving machine from the feed bins.

Accordingly, it is a primary object of the present invention to provide an improved paving machine for continuously blending materials in a completely automatic manner.

It is another object of the present invention to provide a paving machine that produces a more uniform roadway than similar devices used heretofore.

It is an additional object of the present invention to provide a paving machine which requires a minimum number of operating personnel.

Figure 1:
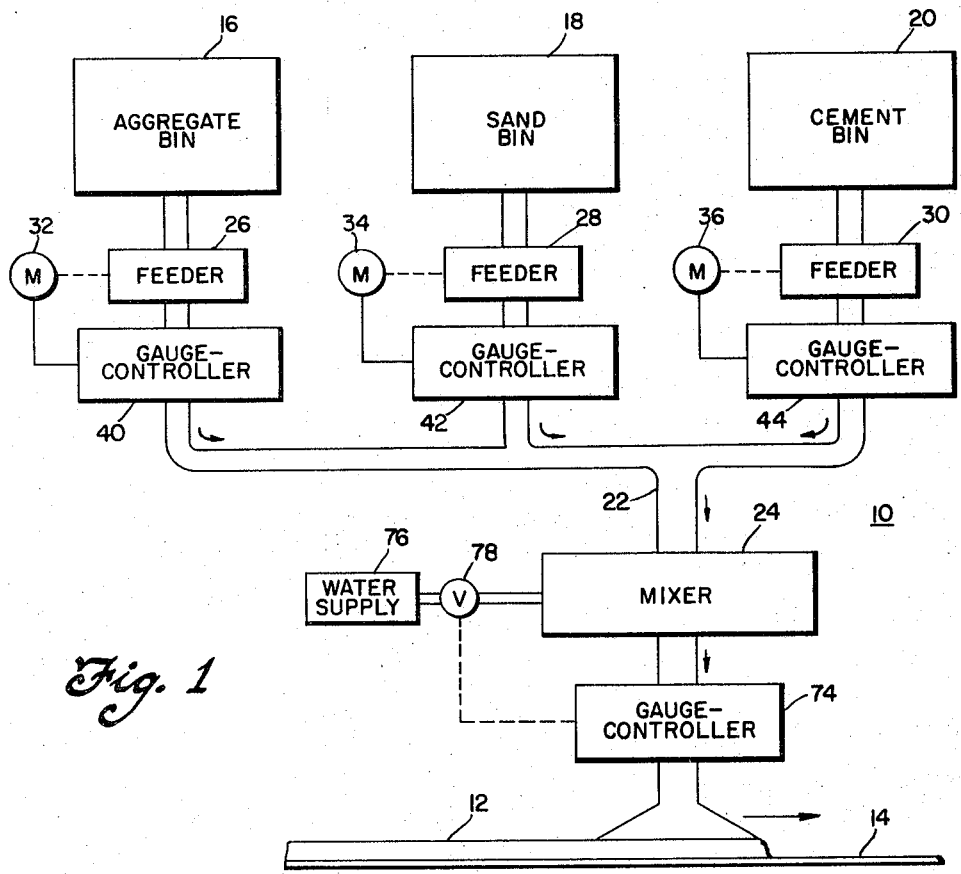
Figure 2:
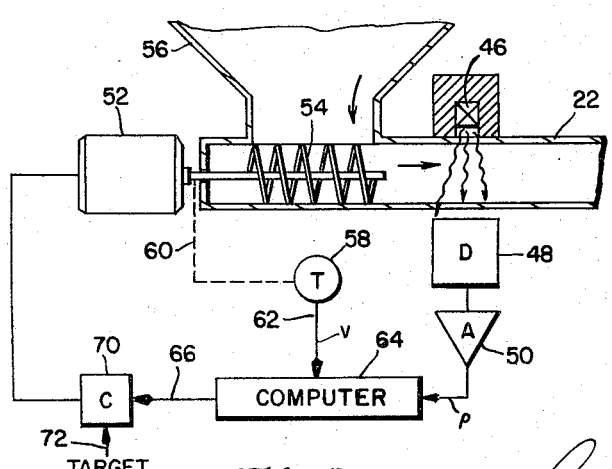

These and other features of the present invention will become more apparent upon reference to the following description taken in conjunction with the drawings, in which:

FIG. 1 is a diagrammatic view of a paving machine in accordance with the present invention; and FIG. 2 is a sectional view partly diagrammatic of a preferred measuring and controlling system for the paving machine shown in FIG. 1.

With reference now to the drawings and specifically to FIG. 1, a road paving machine 10 for depositing a layer 12 of concrete or other substance on a base 14 includes three separate supply bins 16, 18, and 20 connected by means of a conduit 22 to a mixer unit 24. The ingredients for a concrete mix are fed by units 26, 28 and 30 which may comprise an auger feed system adapted to be driven at a controllable speed by motors 32, 34, and 36. Alternatively, the materials may be fed by gravity to the mixer 24. Gates may be provided to control the rate of feed in this case.

The materials from bins 16–20 must be blended in the mixer according to a fixed proportionment of their weights which has previously been determined to yield a layer of concrete having certain desired characteristics. Heretofore, each ingredient had to be weighed and then dumped into the mixer 24 by transit trucks or other transportation media. The mass flow of the ingredients are measured and controlled to yield a desired total mass flow into the mixture having the proper weight ratios. To this end, a plurality of gauge-controllers 40, 42, 44 are mounted on the conduit 22 to measure the mass flow of each ingredient. Referring to FIG. 2, the gauge may comprise a source 46 of gamma radiation and a detector 48 positioned at the opposite side of the conduit 22 and amplifier 50 to provide a signal proportional to the bulk density of material passing between the source 46 and detector 48. A motor 52 drives an auger 54 which forces material out of the superposed bin 56 into the conduit 22. A tachometer 58 is coupled as indicated by the dotted line 60 to the motor 52 to provide an electrical signal on line 62 proportional to the instantaneous velocity of the material into the conduit 22.

The mass flow indicative signal providing the basis for control is produced on line 66 by a computer 64 receiving both the density and velocity representative signals. Inasmuch as the cross-sectional area of flow is maintained constant by the mechanical construction of the conduit, the product of density and velocity yields the required control signal. A control system indicated generally at 70 responds to the mass flow signal in a manner described in U.S. Patent 3,128,786, issued April 4, 1964 to Charles O. Badgett. Briefly, the signal on line 66 is compared with a desired mass flow signal set in at 72 and any error between the two signals initiates an appropriate control action on the motor 52.

In FIG. 1, it may be desirable to utilize a fourth gauge-controller 74 for measuring the mass flow of the output of the mixer 24. This mass flow is a function of the amount of water added to the mixer by a supply 76. It has been found advantageous to control the amount of water admitted to the mixer. To this end, a valve 78 is adjusted by the gauge-controller 74 to maintain a certain desired mass output flow from the mixer 24.

While certain and specific embodiments have been described herein, modifications may be made without departing from the true spirit and scope of the invention as set forth in the appended claims.

I claim:
1. The method of uniformly mixing a plurality of separate ingredients to make concrete, comprising the steps of:
   continuously conveying each of said ingredients at a predetermined, controllable rate toward a concrete mixer unit to produce a predetermined concrete mix,
   measuring the mass flow of each of said conveyed ingredients, and
   controlling the rate of conveyance of each of said ingredients in accordance with said respective measured mass flow to maintain the mass flow of each ingredient into said concrete mixer substantially constant to produce a continuous flow of said concrete mix from said mixer.
2. The method of uniformly mixing a plurality of separate ingredients to make concrete, comprising the steps of:
   continuously conveying each of said ingredients at a controllable rate toward a concrete mixer unit,
   measuring the rate of conveyance of each of said ingredients,
   measuring the density of each of said ingredients, computing the mass flow of each of said ingredients into said concrete mixer unit in accordance with said measured density and conveyance rate, and controlling the rate of conveyance of each of said ingredients in accordance with said respective computed mass flow to maintain the mass flow of each ingredient into said concrete mixer substantially constant.

3. The method of uniformly mixing a plurality of separate ingredients to make concrete, comprising the steps of:

continuously conveying each of said ingredients at a controllable rate toward a concrete mixer unit, continuously measuring the rate of conveyance of each of said ingredients and providing a first signal proportional thereto, passing a beam of radiation through each of said conveyed ingredients, detecting the amount of radiation passing through each of said ingredients to provide a second signal proportional to the density thereof, combining said signals to provide an output signal indicative of the mass flow of each of said ingredients into said concrete mixer, and controlling the rate of conveyance of each of said ingredients in accordance with said output signal to maintain the mass flow of each ingredient into said concrete mixer substantially constant.

4. Control apparatus for mixing a plurality of separate ingredients to make concrete, comprising:

a concrete mixer unit, means for continuously conveying each of said ingredients at a predetermined controllable rate toward said concrete mixer unit to produce a predetermined concrete mix, means for measuring the mass flow of each of said conveyed ingredients, and means for controlling the rate of conveyance of each of said ingredients in accordance with said respective measured mass flow to maintain the mass flow of each ingredient into said concrete mixer unit substantially constant to produce a continuous flow of said concrete mix from said mixer unit.

5. Control apparatus for mixing a plurality of separate ingredients to make concrete, comprising:

a concrete mixer having a plurality of inlet conduits for conveying said separate ingredients, means for continuously feeding each of said ingredients at a controllable rate through said inlet conduits, means for measuring the density of each of said ingredients, means for measuring the rate of feed of each of said ingredients, means for combining said measurements to measure the mass flow of each of said ingredients into said concrete mixer, and means responsive to said measured ingredient mass flow for adjusting the feed rate of each of said ingredients to maintain the mass flow into said concrete mixer substantially constant.

6. Control apparatus for mixing a plurality of separate ingredients to make concrete, comprising:

a concrete mixer having a plurality of inlet conduits for conveying said separate ingredients, means for feeding each of said ingredients at a controllable rate through said inlet conduits, means for measuring the density of each of said ingredients, means for measuring the rate of feed of each of said ingredients, means for combining said measurements to measure the mass flow of each of said ingredients into said concrete mixer, means responsive to said measured ingredient mass flow for adjusting the feed rate of each of said ingredients to maintain the mass flow into said concrete mixer substantially constant, means for adding water to said concrete mixer at an adjustable rate, means for measuring the mass flow of concrete flowing out of said mixer, and means responsive to said measured concrete mass flow for adjusting said water addition rate to said mixer to maintain the mass flow of said concrete substantially constant.

7. Control apparatus for mixing a plurality of separate ingredients, comprising:

a mixing unit for receiving said separate ingredients at different input mass flow rates to provide an output flow of product mixed in proportion to said relative input mass flow rates, means for measuring and controlling the mass flow of each ingredient flowing toward said mixing unit, means for adding liquid at a controllable rate to said mixing unit, means for measuring the mass flow of said mixed product flowing from said mixing unit, and means for adjusting the rate at which said liquid is added to said mixing unit in accordance with said measured mass flow to maintain said mixed product substantially uniform.

8. Control apparatus for mixing a plurality of separate ingredients, comprising:

a mixing unit having a plurality of inlet conduits for conveying said separate ingredients, means for feeding each of said ingredients at a controllable rate through said inlet conduits, means for measuring the density of each of said ingredients, means for measuring the rate of feed of each of said ingredients, means for combining said measurements to measure the mass flow of each of said ingredients into said mixer, means responsive to said measured ingredient mass flow for adjusting the feed rate of each of said ingredients to maintain the mass flow into said mixing unit substantially constant, means for adding water to said mixing unit at an adjustable rate, means for measuring the mass flow of mixer ingredients flowing out of said mixer, and means responsive to said measured mixed ingredient mass flow for adjusting said water addition rate to maintain the mass flow of said mixed ingredients substantially constant.

9. A road paving machine, comprising:

a plurality of ingredient storage bins, a mixing unit having a plurality of inlet conduits each communicating with one of said ingredient storage bins, means for feeding each of said ingredients at a controllable rate through said respective conduit, means for measuring the density of each of said ingredients, means for measuring the rate of feed of each of said ingredients, means for combining said measurements to measure the mass flow of each of said ingredients into said mixer, means responsive to said measured ingredient mass flow for adjusting the feed rate of each of said ingredients to maintain the mass flow into said mixing unit substantially constant, means for adding water to said mixing unit at an adjustable rate, means for measuring the mass flow of mixed ingredients flowing out of said mixer, and means responsive to said measured mixed ingredient mass flow for adjusting said water addition rate to maintain the mass flow of said mixed ingredients from said machine to said road substantially constant.

References Cited by the Examiner

UNITED STATES PATENTS

| | | | |
|---|---|---|---|
| 2,631,827 | 3/1953 | Saxe | 259—154 |
| 2,727,733 | 12/1955 | Carswell | 259—154 |
| 3,110,421 | 11/1963 | Matthias | 259—154 |
| 3,170,677 | 2/1965 | Phister | 259—154 |

FOREIGN PATENTS 880,481  10/1961  Great Britain.

WALTER A. SCHEEL, *Primary Examiner.*

R. W. JENKINS, *Assistant Examiner.*